June 11, 1935.  F. G. THWAITS  2,004,716
VALVE STRUCTURE
Filed Feb. 27, 1933  3 Sheets-Sheet 1
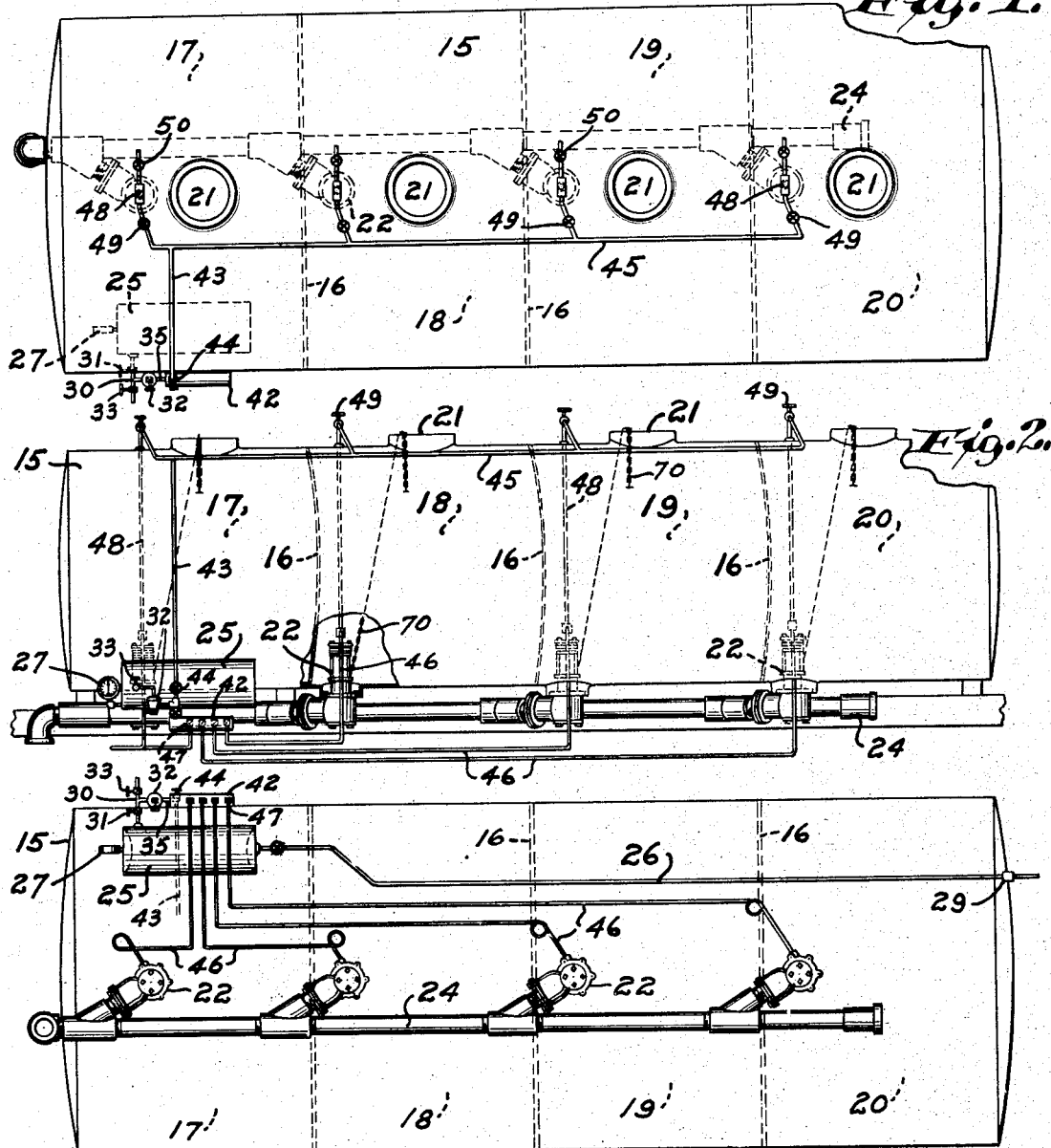
INVENTOR.
F. G. Thwaits
BY
Morsell, Lieber & Morsell
ATTORNEYS.

June 11, 1935.  F. G. THWAITS  2,004,716

VALVE STRUCTURE

Filed Feb. 27, 1933  3 Sheets-Sheet 2

INVENTOR.
F. G. Thwaits
BY
Morsell, Lieber & Morsell
ATTORNEYS.

June 11, 1935.  F. G. THWAITS  2,004,716
VALVE STRUCTURE
Filed Feb. 27, 1933   3 Sheets-Sheet 3
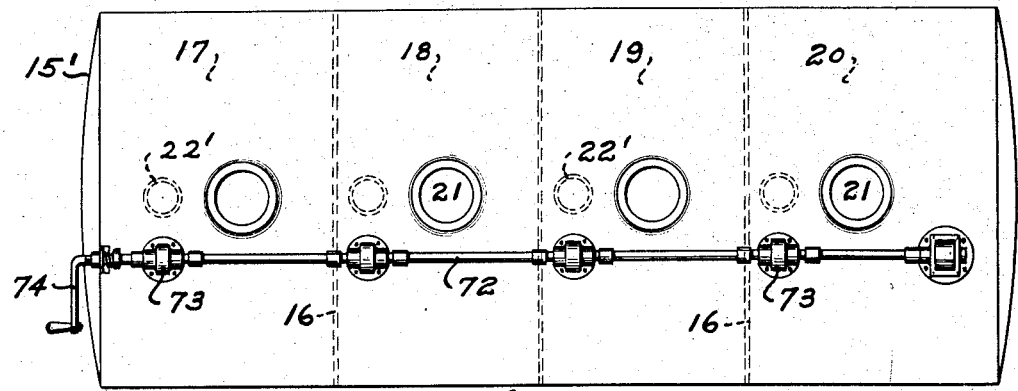
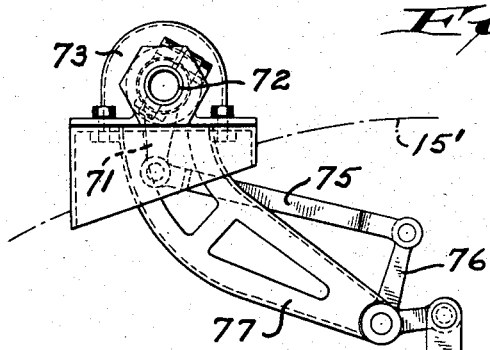
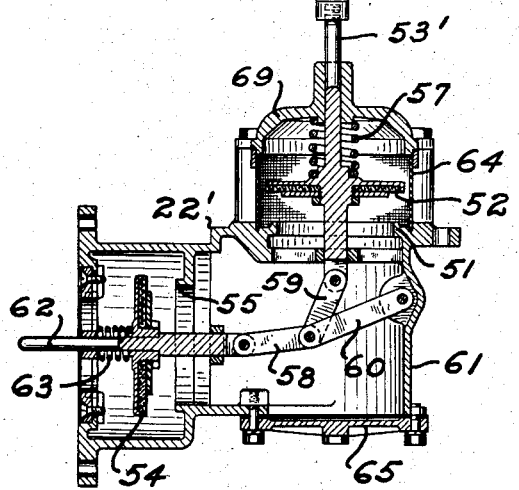
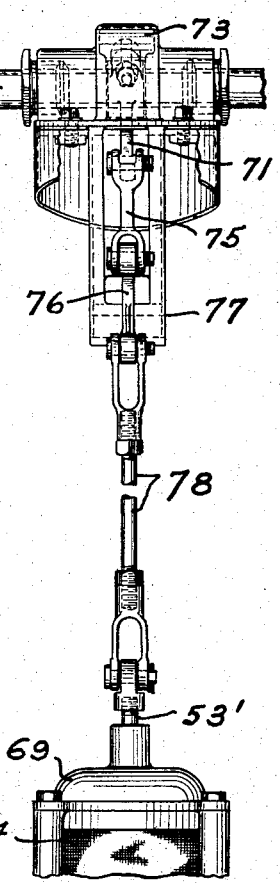
INVENTOR.
F. G. Thwaits
BY
Morsell, Lieber & Morsell
ATTORNEYS.

Patented June 11, 1935

2,004,716

UNITED STATES PATENT OFFICE 2,004,716

VALVE STRUCTURE

Frederick G. Thwaits, Wauwatosa, Wis., assignor to The Heil Co., Milwaukee, Wis., a corporation of Wisconsin Application February 27, 1933, Serial No. 658,787

7 Claims. (Cl. 137—21)

This invention relates generally to improvements in fluid distributing and flow control systems, and relates more specifically to improvements in valve structures for controlling the flow of fluids and especially liquids, from storage or dispensing reservoirs such as tanks.

In prior application Serial No. 643,151, filed Nov. 18, 1932, is disclosed an improved vacuum actuated emergency valve especially applicable to liquid dispensing reservoirs, which is susceptible of being operated either manually or automatically under certain conditions, and which is moreover capable of remote control and adapted to be used in conjunction with other similar valves in a system for dispensinng fluid from several independent sources. While the improved valve of this prior application has proven highly successful in commercial operation and has also demonstrated its utility for various purposes, there is danger in connection with certain applications of the prior valve structure, that the valve will not effectively resist back pressures to which it may be subjected when closed. There may also be danger when using these valves for emergency purposes and when employed for the dispensation of inflammable fluids, that the fluid may reach the vacuum producing source and thereby subject the system to fire hazard. Then too, it has been found desirable to be able under certain conditions, to manually and independently control the vacuum actuation of each of a plurality of the improved valves associated with a common fluid distribution system, in order to enhance the flexibility of the control of the system.

It is, therefore, an object of the present invention to provide various improvements in the construction and operation of valves of the above described type, which will overcome all of the objections and will meet all of the operating conditions specifically referred to.

Specifically defined, an object of this invention is to provide simple and highly effective means for relieving an emergency or shut-off valve from undesirable back pressure, when the valve is closed.

Another specific object of the invention is to provide means for preventing fluid from a distribution or dispensing system, from entering the vacuum source for actuating the control valves of the system.

A further specific object of the invention is to provide improved manually operable control mechanism for a plurality of vacuum actuated emergency or shut-off valves in a common fluid distribution system.

Still another specific object of the invention is to provide an improved auxiliary shut-off for relieving each of a plurality of main valves from pressure tending to open the same after they have been closed, especially when such valves are utilized in liquid distribution systems.

Another specific object of the invention is to provide improved means for assisting the normally functioning mechanism, in maintaining a vacuum actuated emergency valve closed against the back-pressure of liquid in the system with which the valve cooperates.

A further specific object of the invention is to provide an improved float actuated control valve for preventing liquid from a vacuum actuated emergency valve system, from backing-up toward the source of vacuum which actuates the control valve.

These and other specific objects and advantages will be apparent from the following detailed description.

A clear conception of the several features involved in this invention, and of the construction and operation of valves and distribution systems utilizing these features, may be had by referring to the drawings accompanying and forming a part of this specification in which like reference characters designate the same or similar parts in the various views.

Fig. 1 is a somewhat diagrammatic top view of a multiple compartment liquid storage tank having an improved emergency or shut-off valve system applied therein;

Fig. 2 is a similarly diagrammatic side elevation of the multiple compartment tank showing the fluid dispensing and valve control system;

Fig. 3 is a likewise diagrammatic bottom view of the tank, fluid dispensing system, and valve control mechanism;

Fig. 4 is a somewhat diagrammatic end view of the tank, distribution system, and valve control mechanism;

Fig. 10 is a somewhat diagrammatic top view of a multiple compartment tank equipped with manually operable control valves of the improved construction;

Fig. 11 is an enlarged part sectional side view of one of the improved manually operable flow control valves, showing the valve in open position; and Fig. 12 is a similarly enlarged fragmentary front view of the valve operating mechanism for the valve of Fig. 11, showing this mechanism in a position corresponding to closed position of the valve.

Figure 5:
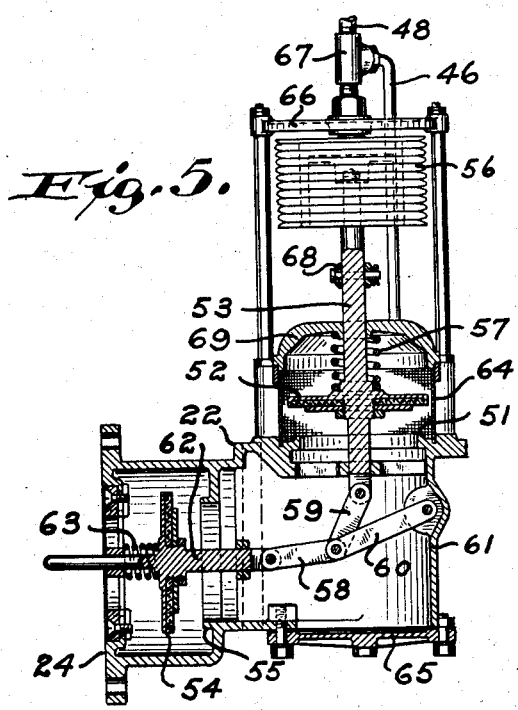
Fig. 5 is a part sectional view of one of the improved vacuum actuated liquid flow control valves, showing the valve in open position.

While the invention has been illustrated and described herein as being specifically applied to a tank truck, and to a liquid dispensing system associated therewith and utilizing the engine of the truck as a primary source of vacuum, it is not intended to thereby unnecessarily restrict the scope of the claims, since some of the novel features are obviously capable of more general application to fluid distribution systems of various types.

Referring specifically to the improved system disclosed in Figs. 1 to 4 inclusive, the multiple compartment receptacle or tank 15 is divided by partitions 16 into segregated compartments 17, 18, 19, 20, each having an upper manhole 21 for permitting inspection of the interior thereof, and also having a lower fluid discharge opening controlled by a vacuum actuated shut-off valve 22. The tank 15 is adapted to be mounted for transportation, upon a truck or other vehicle, in a well-known manner, and may have a running board 23 associated with each of the opposite sides thereof, as shown in Fig. 4, so as to permit an attendant to determine the liquid levels within the several compartments 17, 18, 19, 20 through the manholes 21. The discharge sides of all of the control valves 22 may either be communicable with a common delivery conduit or pipe 24 having the usual dispensing faucet or valve at the delivery end thereof, or each of the valves 22 may be communicable with an independent delivery conduit or pipe as in the copending application hereinabove referred to.

The shut-off valves 22 are all controllable either manually or automatically, by vacuum derived secondarily from a source or reservoir 25, and primarily from a pump or from the intake manifold of the engine which drives the truck, through a pipe line 26 connecting the reservoir 25 with the engine. Obviously, a vacuum pump of any kind may be utilized instead of the truck propelling engine, so that the reservoir 25 may for all practical purposes be referred to as the vacuum source, and this source may be provided with a gage 27 for indicating the degree of vacuum existing within the reservoir 25. As illustrated in Figs. 1 to 4 inclusive, the reservoir 25 is connected directly to the vacuum producing means, by the pipe 26 which has an electrical insulator 29 therein, and has another pipe 30 provided with a shut-off valve 31, leading to a float controlled non-return check valve 32. The pipe 30 may be provided with a branch pipe having a control valve 33 therein for connecting the portion of the pipe 30 beyond the shut-off valve 31 with the atmosphere, and the check valve 32 may be disposed near the lower portion of the reservoir 25 and is constructed as shown in detail in Fig. 9.

Figure 9:
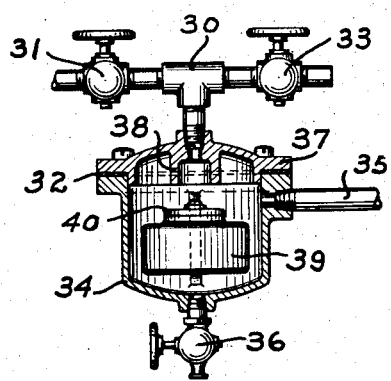
Fig. 9 is a central vertical section through the improved float actuated non-return check valve for preventing liquid from the dispensing system from entering the vacuum source.

The float controlled non-return check valve 32 of Fig. 9, is adapted to prevent liquid from the tank 15 or from the pipe 24 from reaching the reservoir 25, in case such liquid enters the vacuum pipe system, and one or more of these valves 32 may be utilized in the system. This improved automatic safety valve 32 comprises a casing 34 communicating at its upper side portion with a pipe 35 and having a drain cock 36 at the lower end thereof; a cover 37 rigidly attached to the upper end of the casing 34 and having an annular seating 38 with the central portion of which the pipe 30 communicates; and a buoyant float 39 guided for vertical movement within the casing 34 and carrying a valve disk 40 adapted to coact with the seating 38 when the interior of the casing 34 becomes filled with liquid of any kind. The drain cock 36 serves to effect removal of liquid from within the casing 34 in order to open the check valve, and also enables an operator to determine whether there is any leakage of liquid from the liquid confining portion of the system into the vacuum portion thereof.

The pipe 35 which is part of the vacuum portion of the system is directly communicable with the pipe 30 when the safety check valve 32 is open, and has one branch controlled by a valve 41 and communicating with a header 42, and another branch 43 controlled by a valve 44 and communicating with a distributing pipe 45 running along the top of the tank 15. The header 42 is connected to the vacuum actuated operating device of each valve 22 by means of a pipe 46 having a control valve 47 therein near the header, and each of the valves 22 also has a pipe 48 connecting its vacuum actuated operating device with the distributing pipe 45 as shown in Figs. 1, 2 and 4. Each of the pipes 48 has a control valve 49 therein, and these pipes are connectable to the atmosphere by valves 50 located in branch pipes near the pipe 45. The valves 47 are preferably located at some readily accessible point near the reservoir 25, while the valves 49, 50 are located near the manholes 21 of the several compartments 17, 18, 19, 20, and are readily manipulable by an attendant standing on the running-board 23.

Referring specifically to Figs. 5 to 8 inclusive, each of the improved vacuum actuated emergency or shut-off valves 22 comprises an annular valve seat 51; a main disk valve 52 cooperable with the seat 51 and guided to move concentrically thereof by means of a stem 53; an auxiliary disk valve 54 movable simultaneously with the main valve 52 and cooperable with a seat 55; vacuum actuated means including a bellows 56 for simultaneously opening the valves 52, 54; and a spring 57 for assisting the fluid pressure within the compartments 17, 18, 19, 20 in closing the valves 52, 54. The valves 52, 54 may be of similar construction, the valve 52 being disposed within and movable into the adjacent compartment 17, 18, 19, 20 when opening, and the valve 54 being disposed within and opening into the conduit or pipe 24. The simultaneous opening and closing of the valves 52, 54, is effected by a series of links 58, 59, 60, the latter of which is pivotally connected at one end to the adjacent ends of the two former, and at its opposite end to the valve housing 61. The opposite ends of the links 58, 59 are pivotally connected respectively to the stem 62 of the valve 54, and to the lower end of the stem 53 of the valve 52, so that motion of the stem 53 in either direction will be simultaneously imparted to the stem 62 to simultaneously open and close the valves 52, 54. In order to compensate for possible lost motion in the connecting linkage, a relatively light spring 63 may be caused to act upon the auxiliary valve 54 in opposition to the bellows 56, and the springs 57, 63 will obviously assist the pressure in the compartments 17, 18, 19, 20 and in the pipe 24, in closing the valves 52, 54 respectively. The main valve 54 may be provided with a removable strainer or protecting screen 64, and the housing 61 may also be provided with a releasable closure plate 65 for permitting access to the valves and to the linkage connecting the same.

Figure 6:
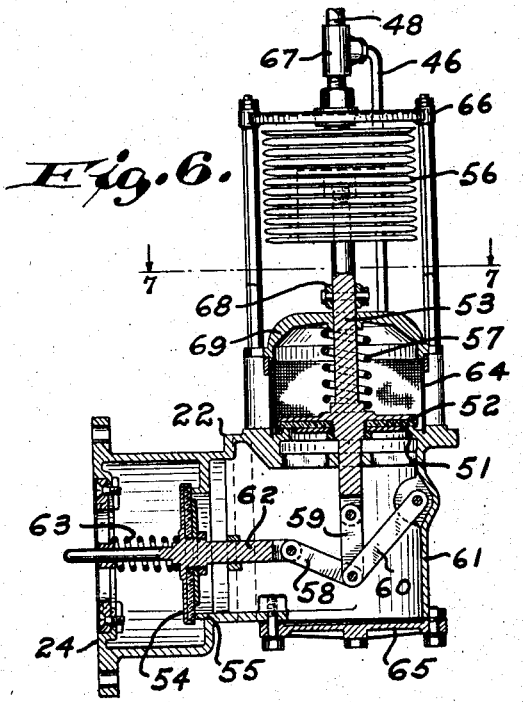
Fig. 6 is a similar view of the control valve, showing the same closed.
Figure 7:
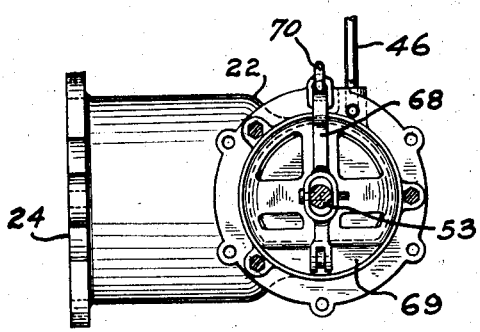
Fig. 7 is a transverse horizontal section through the vacuum actuated control valve, taken along the line 7—7 of Fig. 6.
Figure 8:
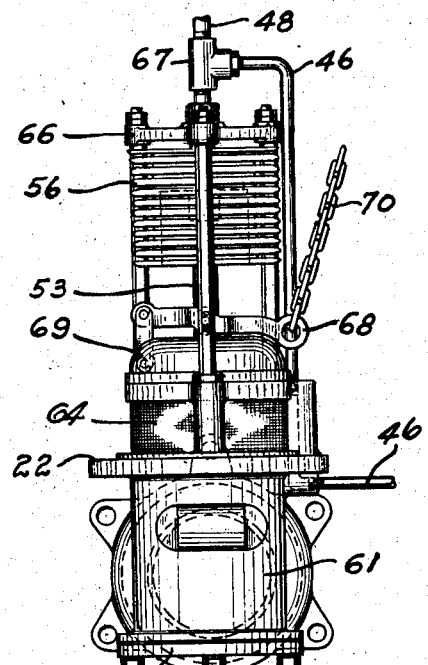
Fig. 8 is a side elevation of the vacuum actuated valve, looking at the valve in a direction ninety degrees in advance of the disclosure in Fig. 6.

The bellows 56 of each valve 22, is adapted to contract as indicated in Fig. 5, upon reduction in pressure therein below atmospheric, and to expand as shown in Fig. 6 upon re-establishment of atmospheric pressure therein. The bellows 56 is attached at its upper end to a suspension plate 66, and has its lower movable end secured to the upper extremity of the main valve stem 53. The vacuum distribution pipes 46, 48 previously described, are communicable with the interior of the bellows 56 through a T-fitting 67, and the medial portion of the stem 53 is pivotally attached to the medial portion of a lever 68 as shown in Figs. 7 and 8. One end of the lever 68 is pivotally attached to the stationary screen retainer 69 while the opposite swinging end thereof has a chain 70 attached thereto and extending upwardly therefrom through the manhole 21 of the corresponding compartments 17, 18, 19, 20 as shown in Fig. 2. The chains 70 serve to permit manual opening of the valves 22, and may be secured to pins or hooks on the tank 15 in order to hold the respective valves open and to prevent the upper chain ends from dropping into the tank.

During normal operation of the improved vacuum actuated control valve system the valves 22 are normally closed, and a vacuum is established within the source or reservoir 25 through the pipe 26, in any desired manner as by operating the propelling motor of the truck upon which the tank 15 is supported. Assuming the compartments 17, 18, 19 to be empty, and that it is desired to fill the successive compartments by admitting liquid thereto from the liquid supply and dispensing pipe 24 past the several shut-off valves 22. The drain cock 36 should first be opened in order to determine whether or not there is any liquid in the vacuum system. If no liquid is present in this system, the float valve 32 will be open, and after the valve 33 has been closed, the valve 31 may be opened to connect the pipe 35 with the vacuum reservoir 25. The valves 41, 47 should be closed, and the valve 44 may then be opened to establish a vacuum in the distribution pipe 45 running along the upper portion of the tank 15, through the pipe 43. With the various vacuum control valves thus set, an attendant may manually actuate the bellows 56 of any of the main valves 22 to either open or close the same, from the running board 23, by manipulating the corresponding valves 49, 50. By closing the valve 50 and opening the adjacent valve 49, the bellows 56 of the corresponding main valve 22 will be connected with the vacuum distribution pipe 45 through the pipe 48, thus causing the bellows to contract and to simultaneously move the disk valves 52, 54 away from their respective seats 51, 55. The attendant may then view the interior of the compartments 17, 18, 19, 20 being filled, through the manhole 21, and when sufficient liquid has entered the compartment, the disk valves 52, 54 may be quickly closed to cut off communication with the pipe 24, by closing the vacuum control valve 49 and opening the adjacent valve 50, whereupon atmospheric pressure will be established within the corresponding bellows 56 and the springs 57, 63 aided by the liquid pressures acting upon the disk valves will effect rapid closing thereof. The successive tank compartments 17, 18, 19, 20 may thus be supplied with liquid either independently or simultaneously, by utilizing the vacuum actuated control devices thereof.

When the tank has been supplied with liquid, the supply to the pipe 24 may be cut off, after which the vacuum control valves 44, 49, 50 should be closed. If it is subsequently desired to dispense liquid from any or all of the tank compartments 17, 18, 19, 20, the valve 41 should be opened to establish a vacuum in the header 42, whereupon the valves 47 in the several pipes 46 may be opened to actuate the several bellows 56 of the main shut-off valves 22 and to thus open these valves. The vacuum control valves 47 for actuating the shut-off valves 22 of the several compartments are preferably located near the faucet or dispensing valve of the pipe 24, so that any desired number of the compartments 17, 18, 19, 20 may be placed into communication with the pipe 24. If for any reason, as by accidental breakage of one of the pipes 46, or by opening of one of the valves 33, 50, the bellows 56 are connected to the atmosphere, the valves 22 will automatically close to immediately cut off communication between the tank compartments and the pipe 24. Also, if liquid should enter the vacuum pipe system, as by leakage through a defective bellows 56, the vacuum within the source or reservoir 25 will cause such leakage liquid to quickly enter the casing 34 of the float actuated valve 32 and to cut off further communication between the pipes 35, 30. The vacuum system therefore provides for emergency or manual shutting off of the liquid delivery from the compartments under all conditions.

If the vacuum control system is not in use, due to inability to establish or to maintain a vacuum in the reservoir 25, the valves 22 may be manually controlled by means of the chains 70. These chains 70 are accessible from the manholes 21, and may obviously be utilized to open the disk valves 52, 54 of any or all of the compartments 17, 18, 19, 20. When the chains 70 are released, the springs 57, 63 aided by the liquid pressure within the tank compartments and pipe 24, will again quickly close the valves 52, 54, thus completing the manual control. It is to be noted that when the disk valve 52 is opened, the auxiliary disk valve 54 is also open; and when the valve 52 is closed, the valve 54 also closes and thereby effectively relieves the valve 52 from pressure existing within the pipe 24. This feature is important since it prevents liquid from some of the compartments 17, 18, 19, 20 which may be filled, from backing up into an empty compartment through the common pipe 24, and also permits use of relatively light springs 57.

This feature of the improvement is also applicable to advantage, to manually operable shut-off valves constructed as shown in Figs. 10, 11 and 12. In this modified structure, the valve structures 22' are similar to the valves 22 previously described, but do not have the vacuum actuated bellows applied thereto. Instead, the disk valves 52, 54 are adapted to be simultaneously opened against the action of the springs 57, 63, by means of levers 71 secured to a common actuating shaft 72 mounted in bearings 73 at the upper part of the tank 15', and running lengthwise of this tank. The shaft 72 is adapted to be rotated by means of a crank 74 or otherwise, and each of the levers 71 has its lower swinging end connected by a link 75 to one arm of a bellcrank 76 which is pivotally supported upon a fixed bracket 77 secured to the adjacent shaft bearing 73. The other arm of each bell-crank 76 is pivotally connected to the upper end of a longitudinally adjustable link 78 the lower end of which is pivotally attached to the upper adjacent end of the corresponding valve stem 53'.

The operation of this modified manually controlled valve structure 22' should be clearly apparent from Figs. 10, 11 and 12. By turning the shaft 72 with the aid of the crank 74 to the position shown in Fig. 11, the disk valves 52, 54 will be simultaneously opened through the links 58, 59, 60. Upon swinging the levers 71 in a counter-clockwise direction to the position shown in Fig. 12, the valves 52, 54 will be simultaneously closed. In this modification, the springs 57, 63 serve only to take up lost motion, and may be omitted if so desired.

From the foregoing description, it will be apparent that the present invention provides simple and highly effective means for relieving the disk valves 52 from back pressure, irrespective of the type of control utilized in conjunction with these valves. The float valve 32 effectively prevents liquid from entering the vocuum control system, and the improved control system of Figs. 1, 2 and 3 is highly efficient and flexible in operation. With the improvement, the valves 22 are capable of operation from points located at remote distances from the valves. and these valves function automatically to stop undesirable escape of liquid. The filling of the tank compartments is under control of the attendant at all times, and this is also true of the liquid dispensation, and the invention has proven highly successful in commercial use.

It should be understood that it is not desired to limit the invention to the exact details of construction herein shown and described for various modifications within the scope of the claims may occur to persons skilled in the art.

It is claimed and desired to secure by Letters Patent:—

1. In combination, a plurality of liquid receptacles, a common conduit communicable with all of said receptacles, a valve for independently establishing and interrupting communication between each of said receptacles and said common conduit, common means for controlling the opening of all of said valves, means for closing each of said valves against the pressure in said conduit, and means operable directly by the closing movement of each of said valves for gradually relieving the back pressure thereon and for maintaining said valves when closed relieved from pressure existing within said conduit.

2. In combination, a liquid confining tank, a conduit communicable with said tank at several places, a valve for establishing and interrupting communication between said tank and said conduit at each of said places, manually operable means for controlling the opening of all of said valves, spring means for independently closing each of said valves against liquid pressure in said conduit, and means operable directly by the closing movement of each of said valves for relieving the same when closed from the pressure existing within said conduit.

3. In combination, a liquid confining tank, a common conduit communicable with said tank at several places, a valve for independently establishing and interrupting communication between said tank and said common conduit at each of said places, common means for controlling the opening of all of said valves, means for independently closing each of said valves against the pressure in said conduit, and means operable directly by the closing movement of each of said valves for gradually relieving the back pressure thereon and for maintaining said valves when closed relieved from pressure existing within said conduit.

4. In combination, a plurality of liquid confining compartments, a conduit communicable with all of said compartments, a valve for independently establishing and interrupting communication between each of said compartments and said conduit, manually controllable means for opening all of said valves, independently operable means for automatically closing each of said valves, and an independent closure mechanically connected directly to each of said valves and operable by the closing movement thereof to relieve the valve when closed from pressure existing within said conduit.

5. In combination, a plurality of liquid confining compartments, a conduit communicable with all of said compartments, a valve located within each of said compartments for independently establishing and interrupting communication between said compartment and said conduit, manually controllable means cooperating with the fluid pressuure within said compartments to open said valves, independently operable mechanical means for automatically closing each of said valves, and an independent closure connected by linkage directly to each of said valves, each of said closures being automatically operable directly by the closing movement of the corresponding valve to relieve said valve when closed from pressure existing within said conduit.

6. In combination, a tank having a plurality of segregated liquid confining compartments, a common conduit communicable with all of said compartments, a valve for independently establishing and interrupting communication between each of said compartments and said conduit, means operable by the fluid pressure within said compartments to open said valves, independent means for closing each of said valves, and an independent closure mechanically connected directly to each of said valves and operable directly by the closing movement thereof to relieve the valve when closed from pressure existing within said conduit.

7. In combination, a tank having a plurality of segregated liquid confining compartments, a common conduit communicable with all of said compartments, a valve for independently establishing and interrupting communication between each of said compartments and said conduit, means operable by the fluid pressure within said compartments to open said valves, independent means for closing each of said valves, and means operable directly by the closing movement of each of said valves for relieving the back pressure thereon and for maintaining said valves when closed relieved from pressure existing within said conduit.

FREDERICK G. THWAITS.